United States Patent
Rankin

(10) Patent No.: US 10,901,739 B2
(45) Date of Patent: Jan. 26, 2021

(54) SYSTEMS AND METHODS FOR CONTROLLING MACHINE OPERATIONS USING STACK ENTRIES COMPRISING INSTRUCTION CONFIGURATION PARAMETERS

(71) Applicant: John Rankin, Morgantown, WV (US)

(72) Inventor: John Rankin, Morgantown, WV (US)

(73) Assignee: Rankin Labs, LLC, Williamsport, OH (US)

(*) Notice: Subject to any disclaimer, the term of this patent is extended or adjusted under 35 U.S.C. 154(b) by 0 days.

(21) Appl. No.: 16/747,242

(22) Filed: Jan. 20, 2020

(65) Prior Publication Data

US 2020/0233668 A1 Jul. 23, 2020

Related U.S. Application Data

(60) Provisional application No. 62/794,991, filed on Jan. 21, 2019.

(51) Int. Cl.
*G06F 9/30* (2018.01)
*G06F 9/38* (2018.01)

(52) U.S. Cl.
CPC ........ *G06F 9/30149* (2013.01); *G06F 9/3001* (2013.01); *G06F 9/30032* (2013.01); *G06F 9/30163* (2013.01); *G06F 9/3836* (2013.01)

(58) Field of Classification Search
CPC ............. G06F 9/30149; G06F 9/30163; G06F 9/30032; G06F 9/3001; G06F 9/3836; G06F 9/30134; G06F 9/38; G06F 9/3004; G06F 9/4484; G06F 7/78
USPC .................................................. 712/41, 202
See application file for complete search history.

(56) References Cited

U.S. PATENT DOCUMENTS

| | | | |
|---|---|---|---|
| 3,688,090 A | 8/1972 | Rankin | |
| 4,493,027 A | 1/1985 | Katz et al. | |
| 6,023,724 A | 2/2000 | Bhatia et al. | |
| 6,026,485 A * | 2/2000 | O'Connor | G06F 9/30181 712/226 |
| 6,567,416 B1 | 5/2003 | Chuah | |
| 6,714,985 B1 | 3/2004 | Malagrino et al. | |
| 6,757,248 B1 | 6/2004 | Li et al. | |
| 7,103,025 B1 | 9/2006 | Choksi | |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Aimee Li
*Assistant Examiner* — Shawn Doman
(74) *Attorney, Agent, or Firm* — Standley Law Group LLP; Adam J. Smith; Jeffrey S. Standley

(57) ABSTRACT

Systems and methods for controlling machine operations are provided. A number of data entries are organized into a stack. Each data entry includes a type, a flag, a length, and a value or pointer entry. For each data entry in the stack, the type of data is determined from the type entry, the presence of an address or value is determined by the respective flag entry, and a length of the address or value is determined from the respective length entry. The data to be utilized or an address for the same at the electronic storage area is provided at the respective value or pointer entry.

19 Claims, 2 Drawing Sheets

(56) References Cited

U.S. PATENT DOCUMENTS

| | | |
|---|---|---|
| 8,374,091 B2 | 2/2013 | Chiang |
| 8,397,151 B2 | 3/2013 | Salgado et al. |
| 9,350,663 B2 | 5/2016 | Rankin |
| 2001/0017844 A1 | 8/2001 | Mangin |
| 2001/0019614 A1 | 9/2001 | Madoukh |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2003/0031198 A1 | 2/2003 | Currivan et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0195824 A1* | 8/2006 | Iwamoto ............... G06F 9/4484 717/133 |
| 2006/0259587 A1 | 11/2006 | Ackerman et al. |
| 2007/0028121 A1 | 2/2007 | Hsieh |
| 2007/0112714 A1 | 5/2007 | Fairweather |
| 2007/0223395 A1 | 9/2007 | Lee et al. |
| 2010/0103830 A1 | 4/2010 | Salgado et al. |
| 2011/0149891 A1 | 6/2011 | Ramakrishna |
| 2011/0161634 A1* | 6/2011 | Sakaguchi ............. G06F 9/324 712/208 |
| 2012/0289250 A1 | 11/2012 | Fix et al. |
| 2012/0297166 A1* | 11/2012 | Fillere ................ G06F 15/7807 712/32 |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0091102 A1 | 4/2013 | Nayak |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0229714 A1 | 8/2015 | Venkatsubra et al. |
| 2016/0269294 A1 | 9/2016 | Rankin |
| 2017/0010900 A1 | 1/2017 | Cobb |
| 2017/0090872 A1 | 3/2017 | Mathew et al. |
| 2018/0018147 A1 | 1/2018 | Sugawara |
| 2018/0060244 A1 | 3/2018 | Godard et al. |
| 2018/0102975 A1 | 4/2018 | Rankin |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

* cited by examiner

SYSTEMS AND METHODS FOR CONTROLLING MACHINE OPERATIONS USING STACK ENTRIES COMPRISING INSTRUCTION CONFIGURATION PARAMETERS

CROSS-REFERENCE TO RELATED APPLICATION

This application claims the benefit of U.S. Provisional Application No. 62/794,991 filed Jan. 21, 2019, the disclosures of which are hereby incorporated by reference as if fully restated.

TECHNICAL FIELD

Exemplary embodiments of the present invention relate generally to systems and methods for controlling machine operations.

BACKGROUND AND SUMMARY OF THE INVENTION

There is a general category of electrical machinery that is often referred to as a "computing machine" or "computer." These computing machines are sometimes connected to, or interfaced with, a wide variety of equipment to produce and operate an almost inexhaustible number of devices. Furthermore, these computing machines operate under the control of programming. Programming can vary the machine's operation, and can function based upon real time decision selection, or external events, that are generally communicated using external device input. Computing machines may operate under the direction of these programs, which execute machine code instructions. Machine code instructions are the basic operational codes that control the machine's operation and are typically entirely specific to the type and manufacture of the computing machine.

Machine code instructions may come in as many different varieties as the number of computing machines available. Therefore, it is common to develop a pseudo machine which may be universally implemented by many different types of computing machines having many different machine code instructions, and thus provide greater portability for programs and object code. This recent development has produced a number of fictitious and pseudo machine definitions that allow for the execution of pseudo code within an emulated pseudo or virtual environment.

There are generally two types of machine operation implementation: register or accumulator, and stack architecture. The register machines have high speed memory locations which can store information, numbers, or addresses, and are called registers or accumulators. Machine instructions may perform operations upon the data held in the registers and may utilize this data to also manipulate and change data stored in general memory. A stack-oriented machine does not implement any specialized locations, but rather has a memory stack. The memory stack is effectively a pointer at a portion of general memory that allows data to be pushed onto and off from the stack; generally, in a last in, first out sequence. Machine instructions perform operations upon the data held in the stack and replace, remove, or insert their results upon the stack.

Computing machines often utilize a complex instruct set code (CISC) for their instruction set. In other words, the number of instructions available for programming operations are often extensive and complex. Some machines have developed many hundreds of machine instructions during their evolutionary development, and these complex sets of instructions include a wide variety of instruction variations. For example, a given machine instruction set often includes an add, add short, add long, add decimal, and add immediate instruction. Each of these different versions of the add instruction are designed to perform addition against different data types. In this brief list, add would operate upon integers, while add long operates upon a 64-bit floating point number. Of course, this is just one limited example. By continually expanding instruct sets, these CISC machines are extremely flexible and offer a large pallet of programming options.

Prior to the development of extremely thin microelectronics, there was a push to reduce the complexity of the processing unit of computing machines. This development produced Reduced Instruction Set Code (RISC) machines. The overall design objective of these instruction sets was to reduce the sheer number of instructions being used in order to improve the efficiency of computing power due to the reduction in necessary electrical circuits. While this approach produced an efficiency in electrical speed, it was ultimately replaced by the exponential reduction in computer size. Furthermore, the complex software still required instructions, and often those instructions involved far more of the RISC instructions than the CISC instructions would have consumed. The failure of RISC as an architectural objective was due to the continued complex requirements from the higher-level software that drove the use of the RISC instructions beyond their intended efficiency. Therefore, what is needed is a system and method for controlling a computing machine using a reduced number of instructions.

These disclosures provide systems and methods for controlling a computing machine using a reduced number of instructions. In exemplary embodiments, the present systems and methods implement a machine pseudo process, where the number of instructions is highly compressed, and can be represented, for example without limitation, by only four bits. Furthermore, with the use of a highly typed and strictly managed operation stack, this highly compressed and reduced instruction set may encompass a complete and complex series of operations. Rather than rely upon instruction formats to identify data types, this information may be contained within the strictly controlled stack. Since the machine execution is operated as a pseudo process, the stack does not need to be limited to a heap of memory as it is in other stack architecture machines. Instead, the stack may be external to the operation of the pseudo machine, and therefore may contain far more information than would otherwise be present. By combing these unique elements, the system and method may provide a highly transportable, extremely compressed machine pseudo process which also provides robust flexibility, complexity, and completeness.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
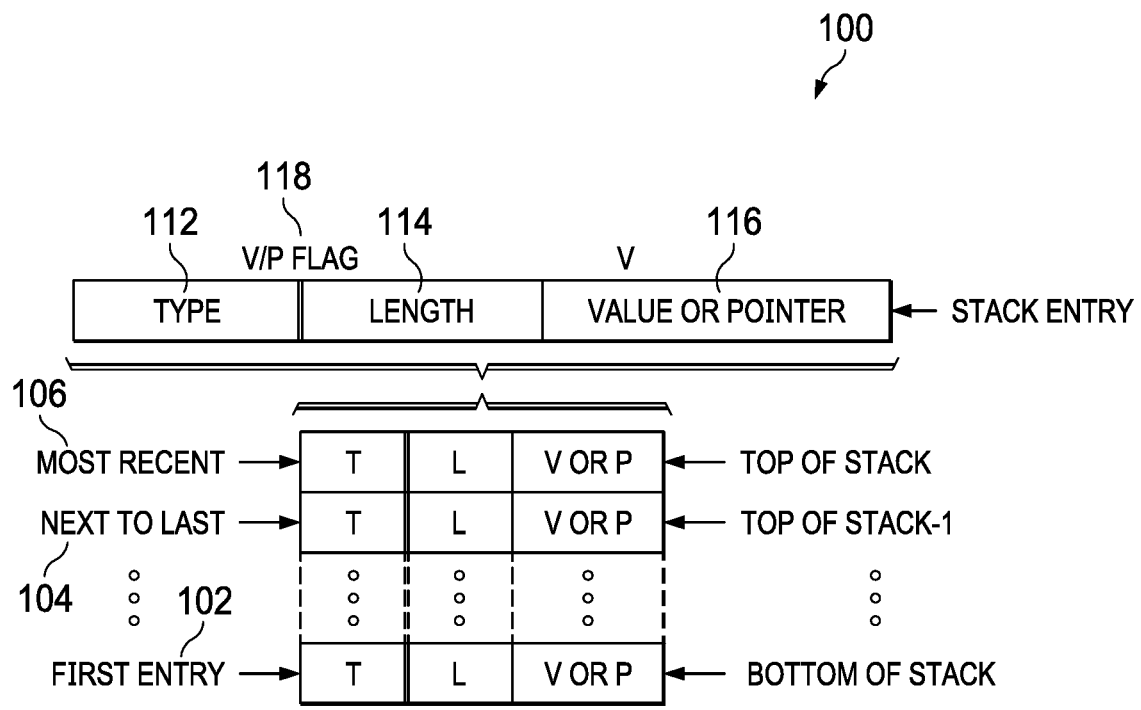
FIG. 1 is an illustration of an exemplary operating stack.
Figure 2:
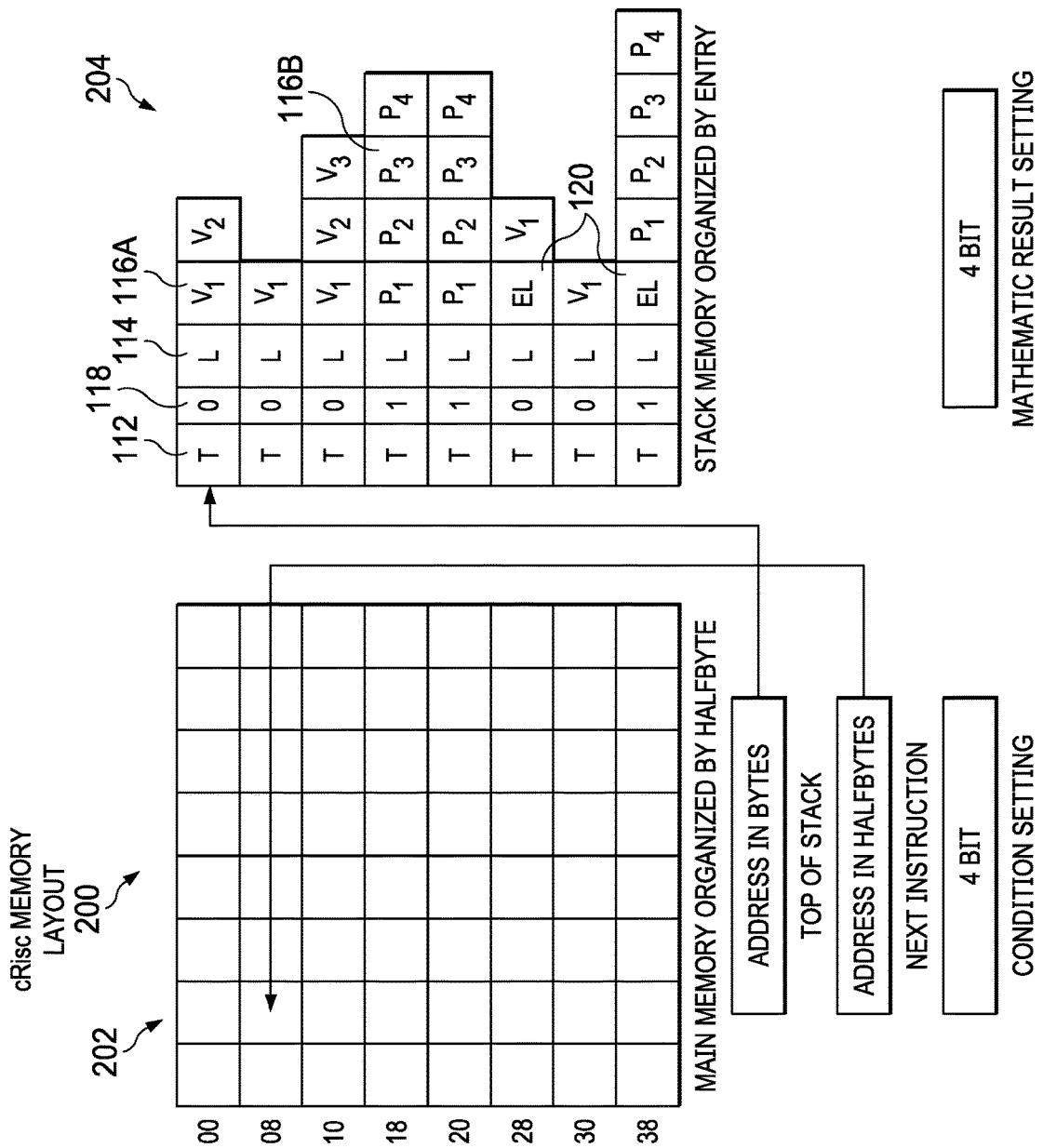
FIG. 2 is an illustration of an exemplary memory layout for use with the operating stack of FIG. 1.

FIG. 1 is an illustration of an exemplary operating stack 100, and FIG. 2 is an illustration of an exemplary memory 200 layout for use with the operating stack of FIG. 1. The machine pseudo process may include two different areas of memory 200: a first area 202 where the code to execute is located, along with its associate variables and storage area; and a second area 204 where the operating stack, its associated entries and their data is located. These two areas of memory 202 and 204 may be handled by a pseudo processor and may not have a direct connection. In other words, programs stored and operating in the main memory 202 may not have access to the information in the stack memory 204.

Operating Stack

The operating stack 100 allows the careful and controlled management of data. Storage of each entry 102, 104, and 106 in inaccessible memory will ensure that no disturbance of the operation can occur without intent. Furthermore, each entry 102, 104, and 106 may contain highly typed information, and therefore the machine instructions may be relieved of the obligation to control this same information. Rather than requiring a multiplicity of add instructions, the type within the stack may determine the kind of add operation that is to occur. Furthermore, by requiring highly typed information within the stack 100, the potential for operation failure is effectively eliminated.

New entries (e.g., entry 106) placed upon the stack 100 may be pushed onto the top of the stack 100, such as but not limited to, in a last in first out order. Therefore, an entry popped, or removed, from the stack 100 may be taken from the top of the stack position (e.g., entry 106), and then the top of the stack 100 may be adjusted to point to the entry that was previously on the top of the stack 100 (e.g., entry 104). In this way, entries may be pushed onto the stack, used, and removed in a last in, first out order for example without limitation. Each machine operation may function using either values on the stack 100 or values pointed to by the stack 100. No values or data may be associated with machine instructions, as this exemplary system may be 100% stack oriented.

An exemplary definition and layout of a stack entry 102, 104, and 106 is provided in Table 3. Three elements may be provided within every entry: a type 112, a length 114, and a value 116.

The Type 112.

The type 112 of an entry may indicate the purpose the value serves. The indication of data type may generally be represented by four bits, such as but not limited to those presented in Table 2. The length of the value may be further determined by the type of data and may be provided in either a compressed length or an extended length. Examples of these two different potentials are provided in Table 2, without limitation.

V or P Flag 118.

There may be a single bit in the stack entry 102, 104, and 106 that determines whether the value is present in the entry 102, 104, and 106 or is pointed to by the entry. If the flag 118 is a 1, for example without limitation, indicating that the entry contains a pointer, then the stack entry points at the location in memory 200 where the value can be found. Pointers are generally a 32-bit memory address, identifying the byte in memory that is the beginning of the value. The length of this value location may be presented in the length field as pointers and are generally 32-bits in length. If the flag 118 is a 0, for example without limitation, indicating that the entry contains a value, then the complete value is presented along with the entry. The flags 118 may comprise any number and type of characters. Any type and length of address is contemplated.

Length.

The length value may be provided in a compressed length 114 or an extended length 120. The compressed length 114 may be a 3-bit field that indicates the length of the value in bytes. Numerical counting may begin with 0, and therefore the length of the value 114 may be as small as one byte or as long as eight for example without limitation. However, any starting value and length may be utilized. In other words, there is generally not a length 114 of zero and every entry may have at least a value of one byte in length. Furthermore, the length field 114 may refer to the length of the value, and not that of the pointer, if it is to be used.

The extended length 120 may add an additional 8-bits to the size of the numerical length 114 to provide a length that is eleven bits in length, for example without limitation. Similar to the compressed length 114, zero is generally not a possible value, so the complete extended length 120 presents a value whose minimum length is one and maximum length is 2048, for example without limitation. This extended length 120 identifies the length of the value in bytes. Furthermore, the extended length field 120 may refer to the length of the value, and not that of the pointer, if it is being used. However, any length is contemplated.

The Value 116A.

If the flag 118 comprises a 0 or other predetermined indication, then a determination may be made that the entry contains a value. The type of the value may be defined by Table 2, for example without limitation. The length of the value may be specified in bytes by the length 114 and/or extended length 120 fields. This value may always begin on a byte boundary. If the flag 118 comprises a 1 or other predetermined indication, then the value 116A may be found by using the pointer.

Pointer 116B.

If the flag 118 comprises a 1 or other predetermined indication, then a determination may be made that the entry holds a 4-byte, 32-bit, or other length or type address that points at a location in memory that begins the value. This location may be provided on a byte boundary and may run for the length identified in the length 114 and/or the extended length 120 fields.

Instruction Execution.

The pseudo process may be controlled by four specific operating elements (for example without limitation, any number of operating elements may be utilized) which may manage and monitor the implementation of the machine instructions: the top of the stack pointer, the next instruction pointer, the condition setting, and the mathematic result setting.

The top of the stack pointer may allow the current operating process to determine where the next stack entry is located. Several operating instructions may make use of the stack in their operation, and a valid pointer should be maintained to the most current entry. This pointer may be an address that points to a byte boundary within stack memory. The next instruction pointer may point to the next instruction to fetch in operation and may be adjusted after loading an instruction for execution. The address may be a 32-bit address specified in half byte values, though any address and value length may be utilized. Each instruction may be a minimum of 4 bits in length, so all branching within the main memory may be achieved and addressed by half byte addresses. The condition setting may be set based upon the execution of the compare instruction. The condition setting may be a four-bit field. The condition setting value may be tested and used for conditional branching using the branch instruction, for example without limitation. Furthermore, the possible values of the condition setting may be dependent upon data being compared, based upon type. (See e.g., without limitation, Table 4). The mathematic result setting may be a four-bit field, for example without limitation, set as a result of one of the mathematic or shift instructions. The mathematic result setting value may be tested and used for conditional branching using the branch instruction, for example without limitation. Furthermore, its possible values are presented in Table 5, for example without limitation.

An exemplary layout of the machine memory is illustrated by FIG. 2, while exemplary specifics of the stack are illustrated in FIG. 1. The possible exemplary instructions are identified in Table 1. The possible exemplary stack entry types are delineated in Table 2, while the exemplary stack entry itself is identified in Table 3. The exemplary response to the execution of the Compare instruction is specified in Table 4, and the exemplary results of all mathematics and shift operations are identified in Table 5. These tables and figures are provided as examples and are not necessarily intended to be limiting.

TABLE 1

| cRisc Instruction | | |
|---|---|---|
| Instruction | Brief Description | Code |
| Invalid | Not a valid operation | 0000 |
| Push | Insert to the top of stack | 0001 |
| Pop | Remove from the top of stack and store | 0010 |
| Move | Transfer and/or convert | 0011 |
| Add | Perform addition | 0100 |
| Subtract | Perform subtraction | 0101 |
| Multiply | Perform multiplication | 0110 |
| Divide | Perform division | 0111 |
| Compare | Compare and set condition | 1000 |
| Branch | Branch to new instruction | 1001 |
| Branchif | Branch on condition to new instruction | 1010 |
| Call | Branch to new instruction, save return | 1011 |
| Shift Right | Shift X bits to right | 1100 |

TABLE 1-continued

| cRisc Instruction | | |
|---|---|---|
| Instruction | Brief Description | Code |
| Shift Left | Shift X bits to left | 1101 |
| Service Call | Perform a call to system service | 1110 |
| Nop | No operation | 1111 |

TABLE 2

| cRisc Data Types | | | |
|---|---|---|---|
| | Type | Brief Description | Code |
| Compressed Length | Zero | Special Zero Value | 0000 |
| | Address | Memory Address | 0001 |
| | Offset | Offset Memory Address | 0010 |
| | Relative | Relative Memory Address | 0011 |
| | Integer | Signed Integer | 0100 |
| | Real | Floating Point Number | 0101 |
| | Absolute | Unsigned Integer | 0110 |
| | Condition | Condition Setting from Compare | 0111 |
| Extended Length | Decimal | Sequence of Base 10 Digits | 1000 |
| | Character | Sequence of Bytes | 1001 |
| | String | String of Characters with Length | 1010 |
| | Mask | Formatting Mask | 1011 |
| | Bit Mask | Bit Mask | 1100 |
| | Bits | Sequence of Bits | 1101 |
| | Logical | Sequence of Logical Settings | 1110 |
| | N Type | No Type | 1111 |

TABLE 3

| cRisc Stack Entry | | |
|---|---|---|
| Bits | Label | Purpose |
| 0-3 | Type | Type of data contained in entry or pointed to by entry (Table 2) |
| 4 | V or P Flag | Flag indicating if the entry contains a value or points to the value |
| 5-7 | Length | Compressed length of 1-8 for number Bytes in value |
| 5-15 | Extended Length | Extended length of 1-2048 for number of Bytes in value |
| 8-X or 16-X | Value | When the V Flag is on, the entry contains a value directly based on length or extended length |
| 8-38 or 16-46 | Pointer | When the P Flag is on, the entry contains a 32 bit pointer to the value whose length is controlled by length or extended length |

TABLE 4

| cRisc Condition Settings | | |
|---|---|---|
| Symbols | Brief Description | Code |
| ø | Nothing | 0000 |
| A > B | A is greater than B | 0001 |
| A < B | A is less than B | 0010 |
| A = B | A is equal to B | 0011 |
| A ⊃ B | Every element of B is also a member of A | 0100 |
| A ⊃ > B | Every B is in A, A is greater than B | 0101 |
| A ⊃ < B | Every B is in A, A is less than B | 0110 |
| A ⊃ = B | Every B is in A, A is equal to B | 0111 |
| A ⊂ B | Every element of A is also a member of B | 1000 |
| A ⊂ > B | Every A is in B, A is greater than B | 1001 |

TABLE 4-continued cRisc Condition Settings

| Symbols | Brief Description | Code |
|---|---|---|
| A ⊂ < B | Every A is in B, A is less than B | 1010 |
| A ⊂ = B | Every A is in B, A is equal to B | 1011 |
| ⊗ | Error | 1100 |
| A >> B | A is much greater than b | 1101 |
| A << B | A is much less than B | 1110 |
| Ø | Empty Set | 1111 |

TABLE 5 cRisc Mathematic Result Setting

| Result Description After Math Operation | Code |
|---|---|
| Zero | 0000 |
| Zero | 0001 |
| Non Zero, Negative | 0010 |
| Non Zero, Positive | 0011 |
| Zero, Overflow | 0100 |
| Zero, Overflow | 0101 |
| Non Zero Overflow, Negative | 0110 |
| Non Zero, Overflow, Positive | 0111 |
| Zero, Underflow | 1000 |
| Zero, Underflow | 1001 |
| Non Zero, Underflow, Negative | 1010 |
| Non Zero, Underflow, Positive | 1011 |
| Impossible | 1100 |
| Impossible | 1101 |
| Impossible | 1110 |
| Impossible - used for unconditional Branch | 1111 |

Tables 1-5 provide examples of the use and function of the stack entry types. However, the provided tables are merely exemplary and are intended to express the potential complexity and variety possible but are not intended to be comprehensive or limiting.

A specific explanation of the pseudo process instructions is useful to explain how the present system and method deviates from previous virtual machines.

Push. The push instruction may insert a new entry onto the stack 100. The previous top of stack entry (e.g., entry 106) may become the next to last entry (e.g., entry 104), thereby effectively pushing down all entries 102, 104, and 106 by one. The stack 100 may be configured to operate in a last in, first out manner, such that the stack 100 may be increased in size by one for every push operation performed. Furthermore, the fully formed stack entry that is pushed onto the stack 100 may follow the push instruction in memory using the format provided in Table 3, though such is not required. The next instruction address may be adjusted to point immediately after the stack entry in main memory, and the condition and mathematic settings may remain unchanged.

Pop. The pop instruction may remove an entry from the top of the stack 100. Immediately following the instruction in memory may be a 32-bit, or other length, address of a location in main memory 200 to hold the stack entry 102, 104, or 106 being removed. Furthermore, this address may use half byte addressing and may point at an area sufficient to hold the receiving entry. The next instruction address may be adjusted to point past the instruction and the receiving address. In other words, the next instruction address may be incremented by 36-bits, for example without limitation. The condition and mathematic settings may remain unchanged.

Move. The move instruction may remove the top entry of the stack (e.g., entry 106) and transfer or convert its value to the value location of the new top of stack 100, which before the operation begins may be the next to last stack entry (e.g., entry 104). The type, flag, and length of the destination location may control if a move or conversion occurs. For example, if the top of the stack (e.g., entry 106) holds an entry that indicates there is a 1000 byte series of characters pointed at by the entry, and the next to last entry (e.g., entry 104) is similar but points at a different location, then the first 1000 bytes may be moved to the second location replacing the area pointed at by the next to last. However, if the top of the stack (e.g., entry 106) contains an integer value, and the next to last entry (e.g., entry 104) is a character sequence, then the integer may be converted to a character string. This operation may move the top of stack ("TOS") value to the next to top ("TOS-1") value using whatever method is required. The TOS may always be removed in the operation and TOS-1 may be the controlling format for type, flag, and length. The next instruction address may be adjusted to point to the instruction that immediately follows the move instruction since the move instruction has no operands, the next instruction address is incremented by 4 bits, for example without limitation.

Add. The add instruction may take the value from the TOS and add it to the TOS-1 value, and then remove the TOS to position the TOS-1 as the TOS. This instruction performs the mathematical operation of addition, where the resulting answer is stored on the stack 100, and the two original entries are replaced during this operation. The position of TOS-1 may be controlling over the final length and type of the operation, and if the value in TOS that is being added does not match, then a mathematical conversion may take place. For example, if the TOS indicates that a real number is pointed to by its entry, but the TOS-1 makes reference to an integer value, then the TOS value may be converted to an integer prior to the operation. The instruction address may be incremented by the length of the add instruction. Since the add instruction has no operands, the next instruction address may be incremented by four bits, for example without limitation. Furthermore, the mathematical setting may be adjusted to reflect the operation, such as described in Table 5.

Subtract. The subtract instruction may operate in substantially the same fashion as the add instruction, with the exception that the TOS value may be subtracted from the TOS-1 value, rather than using addition. As in the previous instruction, the TOS may be removed and the TOS-1 containing the result may replace the old TOS. Furthermore, the next instruction address may be incremented by four bits, for example without limitation, and the mathematic result setting may be adjusted to reflect the operational results.

Multiply. The multiply instruction may operate in substantially the same fashion as the add and subtract instructions, with the exception that the TOS value may contain the multiplier while the TOS-1 may contain the multiplicand. The resulting multiplication operation may produce a result that is stored into the TOS-1, and then the TOS-1 may become the TOS, after removing the old TOS. The instruction address may be incremented by four bits, for example without limitation, and the mathematic result setting may be adjusted to reflect the operational results.

Divide. The divide instruction may operate in substantially the same fashion as the multiply instruction, with the exception that the TOS value may contain the divisor while the TOS-1 may contain the dividend. The resulting division operation may produce a result that is stored into the TOS-1, and then the TOS-1 may become the TOS, after removing the old TOS. The instruction address may be incremented by four bits, for example without imitation, and the mathematic result setting may be adjusted to reflect the operational results.

Compare. The compare instruction may be a non-destructive instruction, only used for examination. The value contained on the TOS may be compared against the value contained on the TOS-1. The type and length of TOS-1 may be controlling for format and any type difference may be resolved through a dynamic conversion to a matching type and length of TOS-1. In other words, if the type and length of the TOS entry differs from that of the entry found at TOS-1, then the value may be converted to the same type and length prior to comparison. After the compare operation has been completed, the results may be stored in the condition setting area as described by Table 4, for example. The next instruction address may be incremented by four bits, for example without limitation, as the compare instruction has no operands. The mathematic result setting may remain unchanged as may the values for TOS and TOS-1.

Branch. The branch instruction may change the value of the next instruction address conditionally based upon the current setting within the mathematic result setting. Immediately following the branch instruction may be a four-bit, for example, setting mask that may be compared with the result setting based upon Table 5, for example. If these settings match, then the next instruction address may be changed to the address whose value must be present on the TOS. If the immediate setting mask is set to B"1111", for example without limitation, an unconditional change may occur. If no conditional or unconditional branch or change in address occurs, then the next instruction address may be incremented by 8 bits, for example, and no setting changes may occur. Furthermore, if a branch takes place, then the TOS may be removed.

Branchif. The branchif instruction may operate similarly with the branch instruction, with the exceptions that a conditional setting mask may follow the instruction, and this may be compared with the condition settings as described in Table 4, for example. Furthermore, unlike the branch instruction, there may be no opportunity for an unconditional branch. All other operations may remain the same.

Call. The call instruction may be used to implement the calling of a subroutine or other function. While the use of a stack may well be used to pass operands and results back and forth between the routines, the operation execution may be relatively simple. The next instruction address may be changed to the address that is located on the TOS, and the TOS may be removed. However, the original next instruction address may be retained and pushed onto the stack 100 so that the calling routine can return from the call with an unconditional branch instruction.

Shift Right. The shift right instruction may immediately be followed in memory by an 8-bit, or other size, operand that may identify the number of bits that need to be shifted right. The value of the TOS entry may be the target of the shifting operation and no other entry within the stack 100 may be affected. Upon completing the operation, the mathematics result settings area may be updated to reflect the operation results and the next instruction address may be incremented by 12-bits, for example without limitation.

Shift Left. The shift left instruction may operate similarly to shift right, however the direction of bit movement may be reversed.

System Service Call. The service call instruction may operate without affecting the stack or condition settings. Immediately following the instruction in memory is an 8-bit, or other size, operand. This 8-bit number may identify the system service and may be used by the operating system to direct the operation call. The use of the stack 100 may be used to pass operands to the service routines, however there is no standard pattern for this operation and stack use may be entirely operating system dependent. After the execution of the instruction, the next instruction address may be incremented by 12-bits, for example without limitation, and no settings may be affected.

Nop. The nop instruction may perform no actions and may only increment the next instruction address by four bits, for example without limitation. This instruction may be used to force the instruction sequence to a byte boundary.

With an implementation of only these fifteen exemplary instructions, it is possible to create an extensive variety of process options, due to the highly unique implementation of a typed stack 100. By allowing type and length to be an element of the stack entry 102, 104, and 106, the instructions themselves may be as simple as possible, and may often take only four bits of main memory, for example without limitation. By allowing dynamic conversion there may be a wide range of flexibility while still controlling the effective nature of the data involved. Forcing stack entries to have tight connection to data types may allow for increased error recovery and stability. Furthermore, by forcing an isolation between stack and program memory, there may be greater control over the environment stability. These instructions, commands, values, and the like are provided as examples and are not intended to be limiting.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for controlling machine operations using a pseudo process with a reduced number of instructions, said system comprising:
   one or more processors;
   a first electronic storage area comprising data;
   a second electronic storage area comprising a number of data entries provided in
      a stack, wherein each data entry comprises a type entry, a flag entry, a length entry, and a value or pointer entry; and
   a third electronic storage area comprising executable software instructions, which
      when executed by the one or more processors configures the one or more processors to:
      determine a type of data in each of the number of data entries from the type entry for the respective data entry;
      determine the length of data in each of the number of data entries from the length entry for the respective data entry;

if the flag entry of a respective one of the number of data entries comprises an indication that the respective data entry comprises a pointer, identify, from data contained within the value or pointer entry, a corresponding location within the first electronic storage area and process the data entry by utilizing data from the corresponding location; and if the flag entry of a respective one of the number of data entries comprises
an indication that the respective data entry comprises a value, process the data entry by utilizing data contained within the value or pointer entry.

2. The system of claim 1 wherein:
the first electronic storage area is contiguous.

3. The system of claim 1 wherein:
said first, second, and third electronic storage areas are located at separate electronic storage devices.

4. The system of claim 1 wherein:
each of the type entries indicates the purpose of the respective data entry.

5. The system of claim 4 wherein:
said type entries are selected from the group consisting of: zero, address, offset, relative, integer, real, absolute, and conditional.

6. The system of claim 4 wherein:
said type entries are selected from the group consisting of: decimal, character, string, mask, bit mask, bits, logical, and N type.

7. The system of claim 1 wherein:
each of the length entries is selected from the group consisting of: standard-length and extended length.

8. The system of claim 7 wherein:
the standard-length indication indicates that the respective value or pointer entry is four bits in length.

9. The system of claim 7 wherein:
the extended length indication indicates that the respective value or pointer entry is thirty-two bits in length.

10. The system of claim 1 wherein:
the second electronic storage area comprises additional executable software instructions, which when executed by the one or more processors configures the one or more processors to perform an operation on the utilized data for each of the number of data entries; and
said operation to be performed is indicated in the data stored at the first electronic storage area.

11. The system of claim 10 wherein:
said operation is selected from the group consisting of: push, pop, move, add, subtract, multiply, divide, compare, branch, branchif, call, shift right, shift left, and service call.

12. The system of claim 1 wherein:
said first, second, and third electronic storage areas are provided at a common computing device.

13. A method for controlling machine operations using a pseudo process with a reduced number of instructions, said method comprising the steps of:
providing an electronic storage area comprising data;
organizing a number of data entries into a stack, wherein each data entry comprises a type entry, a flag entry, a length entry, and a pointer entry or a value entry;
for at least one of the number of data entries in the stack:
determining the type of data from the respective type entry;
determining that the respective data entry comprises an address at the respective pointer entry from the respective flag entry;
determining a length of the address provided at the respective pointer entry from the respective length entry;
identifying data to be utilized from the data at the electronic storage area from the address provided at the respective pointer entry;
retrieving the identified data from the electronic storage area; and
performing a first operation on the retrieved data;
for at least one other one of the number of data entries in the stack:
determining the type of data from the respective type entry;
determining that the respective data entry comprises a value at the respective value entry from the respective flag entry;
determining a length of the value provided at the respective value entry from the respective length entry;
performing a second operation using data contained within the respective value entry.

14. The method of claim 13 wherein:
said first operation and said second operation are selected from the group consisting of:
push, pop, move, add, subtract, multiply, divide, compare, branch, branchif, call, shift right, shift left, and service call.

15. The method of claim 13 wherein:
an address length of no greater than four bits is determined where the respective length entry indicates a standard length.

16. The method of claim 13 wherein:
an address length of no less than thirty-two-bits is determined where the respective length entry indicates an extended length.

17. The method of claim 13 wherein:
said type entries are selected from the group consisting of: zero, address, offset, relative, integer, real, absolute, conditional, decimal, character, string, mask, bit mask, bits, logical, and N type.

18. The method of claim 13 wherein:
the electronic storage area is provided at a remote computing device.

19. The method of claim 13 wherein:
the stack and the electronic storage area are provided at a common computing device.

* * * * *